(12) United States Patent
Ward (10) Patent No.: US 7,817,284 B2
(45) Date of Patent: Oct. 19, 2010

(54) INTERFEROMETRIC FIBER OPTIC GYROSCOPE WITH OFF-FREQUENCY MODULATION SIGNALS

(75) Inventor: Paul A. Ward, Dedham, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 294 days.

(21) Appl. No.: 12/163,621

(22) Filed: Jun. 27, 2008

(65) Prior Publication Data

US 2009/0040526 A1    Feb. 12, 2009

Related U.S. Application Data

(60) Provisional application No. 60/954,790, filed on Aug. 8, 2007.

(51) Int. Cl.
    *G01C 19/72* (2006.01)
(52) U.S. Cl. .................................................... 356/460
(58) Field of Classification Search ......... 356/459–467, 356/470–476; 250/227.19, 227.27; 385/12, 385/14
    See application file for complete search history.

(56) References Cited

U.S. PATENT DOCUMENTS

| | | | |
|---|---|---|---|
| 4,948,252 A | | 8/1990 | Cekorich |
| 5,090,809 A | * | 2/1992 | Ferrar .................. 356/460 |
| 5,170,225 A | * | 12/1992 | Ferrar .................. 356/464 |
| 5,184,195 A | | 2/1993 | Goldner |
| 5,289,258 A | | 2/1994 | Szafraniec et al. |
| 5,321,503 A | | 6/1994 | Bramson |
| 5,363,195 A | | 11/1994 | Ward et al. |
| 5,384,637 A | | 1/1995 | Sanders et al. |
| 5,412,472 A | | 5/1995 | Okada et al. |
| 5,420,684 A | | 5/1995 | Carroll |
| 5,457,532 A | | 10/1995 | August et al. |
| 5,459,575 A | | 10/1995 | Malvern et al. |
| 5,469,257 A | | 11/1995 | Blake et al. |
| 5,530,545 A | | 6/1996 | Pavlath |
| 5,682,241 A | | 10/1997 | Mark et al. |
| 5,719,674 A | | 2/1998 | Martin et al. |

(Continued)

FOREIGN PATENT DOCUMENTS

EP    0586239    3/1994

(Continued)

OTHER PUBLICATIONS

Pavlath (1992) "Fiber optic gyro evolution concept to product," AIAA-1992-4415 in: AIAA Guidance, Navigation and Control Conference, Hilton Head Island, SC, Aug. 10-12, 1992, Technical Papers. Pt. 2 (A92-55151 23-63). Washington, American Institute of Aeronautics and Astronautics, 575-586.

*Primary Examiner*—Hwa S. A Lee
(74) *Attorney, Agent, or Firm*—Goodwin Procter LLP (57) ABSTRACT

Interference in a rotation rate detector signal of an interferometric fiber-optic gyroscope from a bias phase modulator signal may be reduced or substantially avoided by transmitting one or more off-frequency signals having a frequency other than the eigenfrequency of the gyroscope towards a bias phase modulator, generating the bias phase modulator signal having a frequency substantially equal to the eigenfrequency of the gyroscope, and driving the bias phase modulator with the bias phase modulator signal.

14 Claims, 5 Drawing Sheets

U.S. PATENT DOCUMENTS

| | | | |
|---|---|---|---|
| 5,734,469 A * | 3/1998 | Strandjord | 359/459 |
| 5,781,300 A | 7/1998 | Strandjord et al. | |
| 5,914,781 A | 6/1999 | Jaklitsch et al. | |
| 5,923,424 A | 7/1999 | Sanders et al. | |
| 5,926,275 A | 7/1999 | Sanders et al. | |
| 5,946,097 A | 8/1999 | Sanders et al. | |
| 5,953,123 A | 9/1999 | Jaklitsch et al. | |
| 5,999,304 A | 12/1999 | Sanders et al. | |
| 6,028,668 A | 2/2000 | Rider | |
| 6,046,810 A | 4/2000 | Sanders et al. | |
| 6,351,310 B1 | 2/2002 | Emge et al. | |
| 6,469,792 B1 | 10/2002 | Arnn | |
| 6,473,182 B1 | 10/2002 | Tazartes et al. | |
| 6,563,589 B1 | 5/2003 | Bennett et al. | |
| 6,765,678 B2 | 7/2004 | Strandjord et al. | |
| 7,034,946 B2 | 4/2006 | Chen et al. | |
| 7,038,783 B2 * | 5/2006 | Standjord et al. | 356/460 |
| 7,333,209 B2 | 2/2008 | Greening et al. | |
| 7,336,364 B2 | 2/2008 | Greening et al. | |
| 2001/0030752 A1 | 10/2001 | Scruggs et al. | |
| 2003/0128365 A1 | 7/2003 | Strandjord et al. | |
| 2007/0103691 A1 | 5/2007 | Greening et al. | |
| 2007/0121116 A1 | 5/2007 | Greening et al. | |
| 2008/0079946 A1 | 4/2008 | Greening | |

FOREIGN PATENT DOCUMENTS

| | | |
|---|---|---|
| EP | 0990118 | 4/2000 |
| EP | 1790944 | 5/2007 |

* cited by examiner

INTERFEROMETRIC FIBER OPTIC GYROSCOPE WITH OFF-FREQUENCY MODULATION SIGNALS

CROSS-REFERENCE TO RELATED APPLICATION

This application claims priority to and the benefit of, and incorporates herein by reference in its entirety, U.S. Provisional Patent Application No. 60/954,790, which was filed on Aug. 8, 2007.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N00030-05-C-0007 awarded by the U.S. Navy.

TECHNICAL FIELD

Embodiments of the invention generally relate to interferometric fiber-optic gyroscopes. More particularly, the invention relates, in various embodiments, to generating a bias phase modulator signal from an off-frequency signal transmitted within the interferometric fiber-optic gyroscope.

BACKGROUND

Interferometric fiber-optic gyroscopes are being increasingly used in medium to high performance inertial applications. For example, interferometric fiber-optic gyroscopes are used in inertial navigation applications, such as in military applications of a tactical nature (i.e., of short range, short time, and lower performance) and of a strategic nature (i.e., of long range, long time, and higher performance). Interferometric fiber-optic gyroscopes are also used in many commercial applications. As one example, a tactical-grade interferometric fiber-optic gyroscope is used to stabilize the yellow line projected on the ground during a televised football game to indicate the point that must be crossed by the offense to make a "first down."

An interferometric fiber-optic gyroscope typically uses an integrated-optic bias phase modulator to introduce a non-reciprocal phase shift to counter-propagating light beams to aid in the measurement of the inertial rate of the gyroscope. The bias phase modulator is typically biased by a signal that oscillates at the eigenfrequency of the gyroscope, which is equal to the inverse of twice the transit time of the gyroscope's fiber coil. A rotation rate detector signal, which contains information regarding the inertial rate of the gyroscope, may also oscillate at the eigenfrequency. Typically, both signals are transmitted via different but proximate wires, and thus the rotation rate detector signal is susceptible to interference from the bias phase modulator signal. Because the bias phase modulator signal must be large to obtain high gyroscope sensitivity and because the detected rotation rate signal is very small for small inertial rates, isolation requirements between the bias phase modulator signal and the rotation rate detector signal are very high, for example as high as 160 dB for high-performance gyroscopes. It is nearly impossible, however, to obtain this required isolation in practice. Because the bias phase modulator signal is often routed throughout the system and may even share the same connector(s) as the sensitive rotation rate detector signal, there are many potential opportunities for corruption of the rotation rate detector signal by the bias phase modulator signal.

SUMMARY OF THE INVENTION

The present invention, in various embodiments, generates a bias phase modulator signal for an interferometric fiber-optic gyroscope having negligible signal power at or near the eigenfrequency of the gyroscope (i.e., an off-frequency bias phase modulator signal), and then uses an electronic circuit, or other mechanism, to convert this off-frequency bias phase modulator signal to a signal that has substantial signal power at or near the eigenfrequency of the gyroscope. The conversion may occur at a point close to the bias phase modulator (i.e., the point of use), so that the majority of the signal path of the bias phase modulator signal occurs when it is at an off-frequency. Thus, interference caused to the rotation rate detector signal by the bias phase modulator signal is essentially out-of-band, and is easily removed by conventional signal processing.

Accordingly, in a first aspect, a method for driving a bias phase modulator in an interferometric fiber-optic gyroscope includes transmitting, towards the bias phase modulator, at least one off-frequency signal having a frequency different from an eigenfrequency of the gyroscope. A bias phase modulator signal is generated from the off-frequency signal(s) and has a frequency substantially equal to the eigenfrequency of the gyroscope. The bias phase modulator signal then drives the bias phase modulator.

In various embodiments, two off-frequency signal(s) are generated and transmitted. The two signals may be offset by 90 degrees from one another. Alternatively, the two signals may be substantially equal in magnitude, but opposite in sign, to one another. The off-frequency signals(s) may each have a frequency substantially equal to one-half the eigenfrequency of the gyroscope and/or negligible signal power at or near the eigenfrequency of the gyroscope.

In general, in another aspect, a signal converter for use in a gyroscope includes at least one input for receiving an off-frequency signal having a frequency different from an eigenfrequency of the gyroscope. The signal converter further includes circuitry for generating, from the off-frequency signal, a bias phase modulator signal having a frequency substantially equal to the eigenfrequency of the gyroscope. An output of the signal converter provides the bias phase modulator signal to a bias phase modulator of the gyroscope.

In various embodiments, the signal converter features two inputs, each for receiving a single off-frequency signal. The two off-frequency signals may be offset by 90 degrees from one another. Alternatively, the two signals may be substantially equal in magnitude, but opposite in sign, to one another. The off-frequency signal(s) may each have a frequency substantially equal to one-half the eigenfrequency of the gyroscope and/or negligible signal power at or near the eigenfrequency of the gyroscope. The signal generation circuitry may include an XOR gate or a rectifier circuit. In one embodiment, the circuitry introduces no appreciable delay between the off-frequency signal received at the input of the signal generator and the bias phase modulator signal provided at its output.

In general, in yet another aspect, a system for driving a bias phase modulator in an interferometric fiber-optic gyroscope includes an off-frequency signal generator for transmitting at least one off-frequency signal that has a frequency different from an eigenfrequency of the gyroscope. The system also includes a signal converter for generating, from the at least one off-frequency signal, a bias phase modulator signal that has a frequency substantially equal to the eigenfrequency of the gyroscope. The signal converter also provides the bias phase modulator signal to the bias phase modulator.

In various embodiments, the off-frequency signal generator is further configured to generate the at least one off-frequency signal. Each off-frequency signal may have negligible signal power at or near the eigenfrequency of the gyroscope. A signal processing circuit for removing out-of-band interference from a rotation rate detector signal output from the gyroscope may also be included in the system. The system may also include the bias phase modulator.

In general, in still another aspect, a method for driving a bias phase modulator in an interferometric fiber-optic gyroscope includes transmitting, towards the bias phase modulator, at least one first signal having negligible signal power at or near an eigenfrequency of the gyroscope. A bias phase modulator signal having measurable signal power at or near the eigenfrequency of the gyroscope is generated from the first signal(s). The bias phase modulator may then be driven with the bias phase modulator signal.

In general, in a further aspect, a system for driving a bias phase modulator in an interferometric fiber-optic gyroscope includes a means for transmitting, towards the bias phase modulator, at least one first signal having negligible signal power at or near an eigenfrequency of the gyroscope. The system also includes a means for generating, from the first signal(s), a bias phase modulator signal having measurable signal power at or near the eigenfrequency of the gyroscope. A means for driving the bias phase modulator with the bias phase modulator signal is also included.

BRIEF DESCRIPTION OF THE DRAWINGS

The foregoing and other objects, aspects, features, and advantages of embodiments of the invention will become more apparent and may be better understood by referring to the following description taken in conjunction with the accompanying drawings, in which.

DESCRIPTION

In various embodiments, the present invention pertains to systems and methods for reducing noise in a rotation rate detector signal output from an interferometric fiber-optic gyroscope. In broad overview, in accordance with one embodiment of the invention, an off-frequency signal, having a frequency different from the eigenfrequency of the gyroscope, is transmitted towards a bias phase modulator of the gyroscope. A signal converter, located proximate to the bias phase modulator, receives the off-frequency signal and generates a bias phase modulator signal that has a frequency substantially equal to the eigenfrequency of the gyroscope, and drives the bias phase modulator with the bias phase modulator signal.

Figure 1:
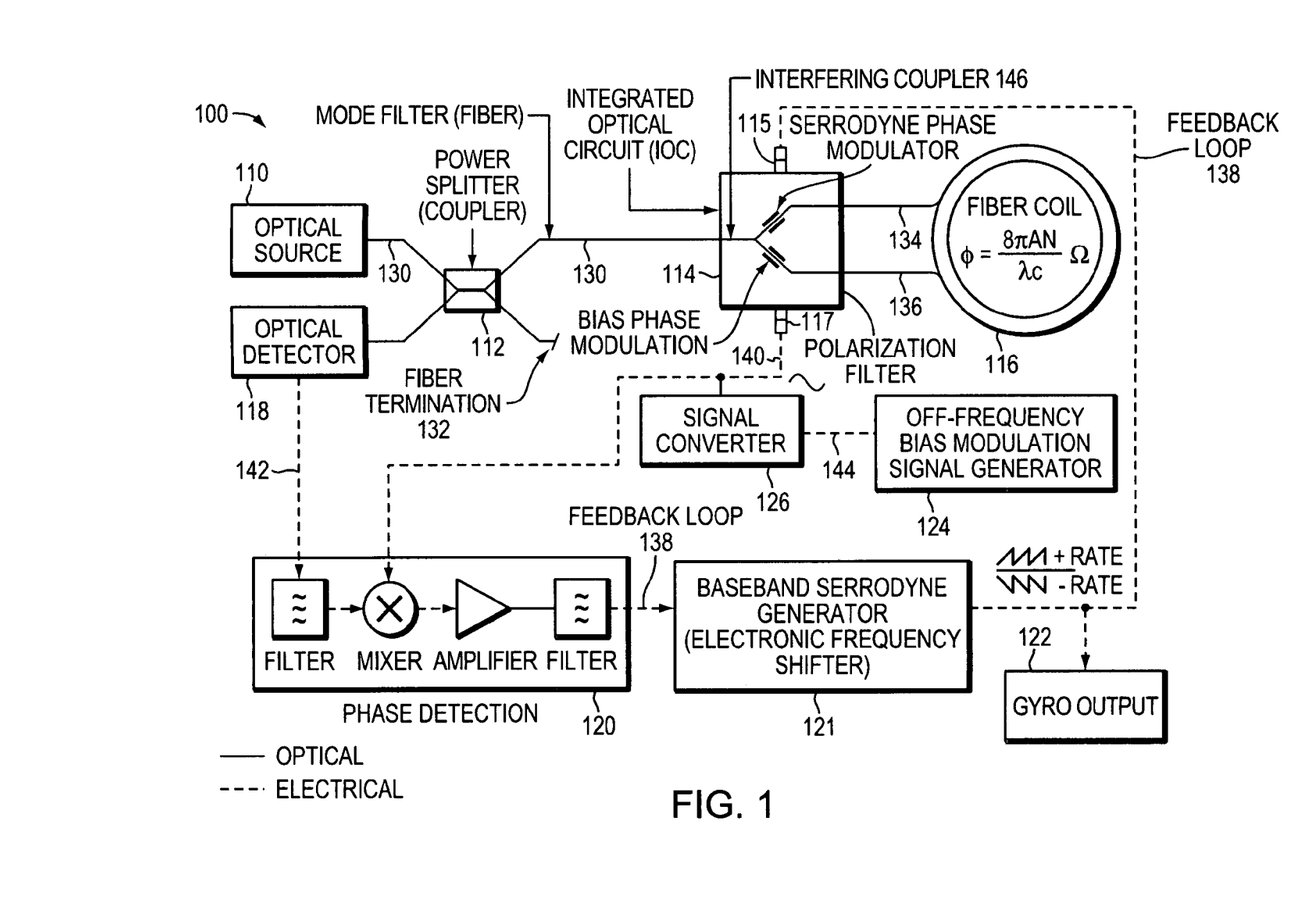
FIG. 1 illustrates a block diagram of an interferometric fiber-optic gyroscope in accordance with one embodiment of the invention.

FIG. 1 depicts one embodiment of an interferometric fiber-optic gyroscope 100, the performance of which may be improved using the approach of the present invention. Among other elements, the exemplary interferometric fiber-optic gyroscope 100 includes an optical source 110, a power splitter/coupler 112, a bias phase modulator (or integrated optical circuit) 114, a fiber coil 116, an optical detector 118, phase detection electronics 120, a baseband serrodyne generator 121, output 122, an off-frequency bias modulation signal generator 124, and a signal converter 126.

In general overview of the operation of the interferometric fiber-optic gyroscope 100 and of the propagation of light therethrough, the optical source 110 emanates, in one embodiment, a wavepacket that travels down a single-mode fiber 130 acting as a mode filter. The power splitter/coupler 112 then divides the wavepacket. In one embodiment, approximately 50% of the wavepacket is sent along the single-mode fiber 130 to the bias phase modulator 114, with a second, remaining portion of the wavepacket being dissipated in, for example, a terminated, coreless optical fiber 132. In one embodiment, the terminated, coreless optical fiber 132 prevents the second portion of the wavepacket from reflecting back into the rest of the interferometric fiber-optic gyroscope 100.

In one embodiment, the bias phase modulator 114 is a Y-branch phase modulator that is constructed from, for example, lithium niobate ($LiNbO_3$) waveguides. As further described below, the Y-branch bias phase modulator 114 includes a drive input 115 for receiving a drive signal, and a modulation input 117 for receiving a bias phase modulation signal 140. The Y-branch bias phase modulator 114 may polarize the portion of the wavepacket it receives from the power splitter/coupler 112, and may also further split that portion of the wavepacket into two approximately equal sub-portions. One of the two sub-portions may then travel down a first arm 134 of the bias phase modulator 114 and the other of the two sub-portions down a different, separate arm 136 of the phase modulator 114. As depicted in FIG. 1, the first arm 134 of bias phase modulator 114 causes the first sub-portion of the wavepacket to travel around the fiber coil 116 in a clockwise direction, while the second arm 136 of the bias phase modulator 114 causes the second sub-portion of the wavepacket to travel around the fiber-coil 116 in a counter-clockwise direction.

In one embodiment, when the fiber coil 116 is stationary, each sub-portion of the wavepacket travels the same distance in circulating the fiber coil 116 and thus acquires the same amount of phase. In other words, the two sub-portions of the wavepacket travel "reciprocal" paths and the net phase difference between them is zero. When the fiber coil 116 is rotated, however, the two sub-portions of the wavepacket may acquire a "nonreciprocal" net phase difference due to the Sagnac effect. More specifically, the sub-portion of the wavepacket traveling in the same direction as the rotation of the fiber coil 116 will take slightly longer to circulate the fiber coil 116 than the sub-portion of the wavepacket traveling in a direction opposite the direction of rotation of the fiber coil 116, thereby leading to a nonreciprocal net phase difference between the two sub-portions of the wavepacket. This nonreciprocal net phase difference may be increased by using multiple turns of fiber in the fiber coil 116. In particular, the nonreciprocal net phase difference due to the Sagnac effect is given mathematically as:

$$\Delta\varphi = \frac{8\pi AN}{\lambda_0 c_0} \Omega$$

where $\Delta\phi$ is the phase shift between the two sub-portions of the wavepacket, A is the area enclosed by the fiber coil 116, N is the number of turns in the fiber coil 116, $\Omega$ is the speed of rotation of the fiber coil 116, $c_0$ is the speed of light in a vacuum, and $\lambda_0$ is the wavelength of light in a vacuum.

In one embodiment, as the clockwise and counter-clockwise sub-portions of the wavepackets complete their transits through the fiber coil 116, the Y-branch bias phase modulator 114 recombines them and sends them back along the single-mode fiber 130 towards the power splitter/coupler 112. As before, the power splitter/coupler 112 sends approximately 50% of the recombined wavepacket to optical detector 118, which converts the wavepacket's light into a photovoltage, while a remaining portion of the recombined wavepacket is dissipated in, for example, the optical source 110.

As described further below, the off-frequency bias modulation signal generator 124 may create at least one voltage waveform 144 (e.g., two voltage waveforms 144) having a frequency (or frequencies) other than that of the eigenfrequency of the gyroscope 100. In one embodiment, each waveform 144 is a square wave. The signal generator 124 may be any type of signal generator known in the art that is programmable to produce the exemplary off-frequency signals 144 described and illustrated below, or any specific circuit design capable of producing such exemplary off-frequency signals 144. The signal converter 126 receives the off-frequency waveform(s) 144 and drives the second arm 136 of the bias phase modulator 114 with a converted bias phase modulator waveform 140 having a frequency substantially equal to the eigenfrequency of the gyroscope 100. As shown in FIG. 1, the signal converter 126 may be located physically near the bias phase modulator 114, while the off-frequency bias modulation signal generator 124 may be located at any position inside or outside the gyroscope 100.

The bias phase modulator signal 140 may have a maximum value of $V_{\pi/4}$ volts and a minimum value of $-V_{\pi/4}$ volts, where $V_\pi$ is the voltage required to change the phase of light traveling through an arm of the of the fiber coil 116 by $\pi$ radians. In one embodiment, the period of the bias phase modulator signal 140 is $2\tau$, where $\tau$ is the time it takes for a wavepacket to circulate the fiber coil 116. The corresponding frequency of the bias phase modulator signal 140 is thus the inverse of $2\tau$, which is known as the eigenfrequency of the gyroscope. In one embodiment, the bias phase modulator 114 is biased first by a voltage of $V_{\pi/4}$ applied to its second arm 136, which changes the phase of, for example, the outgoing counter-clockwise wavepacket by $\pi/4$ radians. Then, at a time $\tau$ later, the bias phase modulator 114 is biased by a voltage of $-V_{\pi/4}$ applied to its second arm 136, which changes the phase of the incoming clockwise wavepacket by $-\pi/4$ radians. Accordingly, when the clockwise and counter-clockwise wavepackets interfere, their phase shifts will combine to produce a net phase shift of $\pi/2$ radians. Similarly, when the bias phase modulator 114 is biased by a voltage of $-V_{\pi/4}$ applied to its second arm 136, the bias phase modulator 114 may shift the phase of an outgoing counter-clockwise wavepacket by $-\pi/4$ radians, and a bias voltage of $V_{\pi/4}$ applied to the second arm 136 may shift the phase of an incoming clockwise wavepacket by $\pi/4$ radians, producing a net phase shift therebetween of $-\pi/2$ radians. The optical phase between the clockwise and counter-clockwise wavepackets may thus dither between $-\pi/2$ and $\pi/2$ radians. In one embodiment, the net phase shift has an absolute value greater than $\pi/2$ radians.

In one embodiment, when the fiber coil 116 is at rest, the optical phase shift between the clockwise and counter-clockwise wavepackets will continuously alternate between $-\pi/2$ and $\pi/2$ radians, and each of the clockwise and counter-clockwise wavepackets will have substantially identical light intensity values. In such a case, the optical detector 118 outputs a constant-level, non-zero voltage in response to the constant light intensity inputs. As the fiber coil 116 rotates, however, the Sagnac phase shift of $\Delta\phi$, described above, will cause the optical phase shift between the clockwise and counter-clockwise wavepackets to alternate between $\Delta\phi-\pi/2$ radians and $\Delta\phi+\pi/2$ radians. In such a case, the optical detector 118 outputs a square wave (alternating between two different voltage levels) having the same frequency as the bias phase modulator signal 140 (i.e., $1/2\tau$). The output 142 of the optical detector 118 may represent the detected rate of rotation of the gyroscope 100.

Without applying the bias phase modulator signal 140 to the bias phase modulator 114, the current flowing through the optical detector 118 in the interferometric fiber-optic gyroscope 100 would be proportional to a biased cosine function. That is, the detector 118 current would be proportional to $$[1+\cos \Delta\theta]$$

where $\Delta\theta$ is the non-reciprocal phase shift between the clockwise and counterclockwise light waves at the optical Y-junction of the interfering coupler 146, where the counter-propagating waves interfere. The cosine function lacks sensitivity, however, for small phase (and also lacks polarity information) and thus cannot detect small inertial rates. Accordingly, as described above, non-reciprocal phase modulation is imparted to the counter-propagating light beams using the bias phase modulator 114, and the period of the modulation is adjusted to be equal to twice the coil 116 transit time. The result is that a signal proportional to the sine of the non-reciprocal phase is produced after demodulation. The sine function, in contrast to the cosine function, has high sensitivity (as well as polarity information) for small values of phase, resulting in the ability to detect small values of inertial rate.

In one embodiment, the output 142 of the optical detector 118 is sent to the phase detection block 120, where it is first filtered to remove noise, and then mixed with the bias phase modulator signal 140 to obtain the amplitude of the signal. The mixing may include synchronously demodulating the filtered optical detector output 142 at the frequency of the bias phase modulator signal 140. The mixed signal may then amplified and filtered to control the frequency components of the signal, prior to being input into a feedback loop 138. The noise signals filtered by the phase detection block 120 may be those signals having a frequency other than that of the eigenfrequency of the gyroscope 100.

In one embodiment, the baseband serrodyne generator 121, after receiving a signal from the phase detection block 120, outputs a serrodyne (i.e., ramp) waveform through the feedback loop 138 to drive the bias phase modulator 114. This "closed loop" scheme of interferometric fiber-optic gyroscope operation keeps the optical phase between the clockwise and counter-clockwise wavepackets output from the fiber coil 116 dithering between $\pi/2$ and $\pi/2$ radians (rather than between $\Delta\phi-\pi/2$ radians and $\Delta\phi+\pi/2$ radians), which maximizes sensitivity and certainty and ensures scale factor linearity. In other words, the serrodyne signal is intended to offset the Sagnac phase $\Delta\phi$ generated by the rotation of fiber coil 116. The magnitude of the Sagnac phase, and thus the inertial rate of rotation, may be derived from the slope of the serrodyne signal, which is output at the gyroscope output 122.

Figure 2:
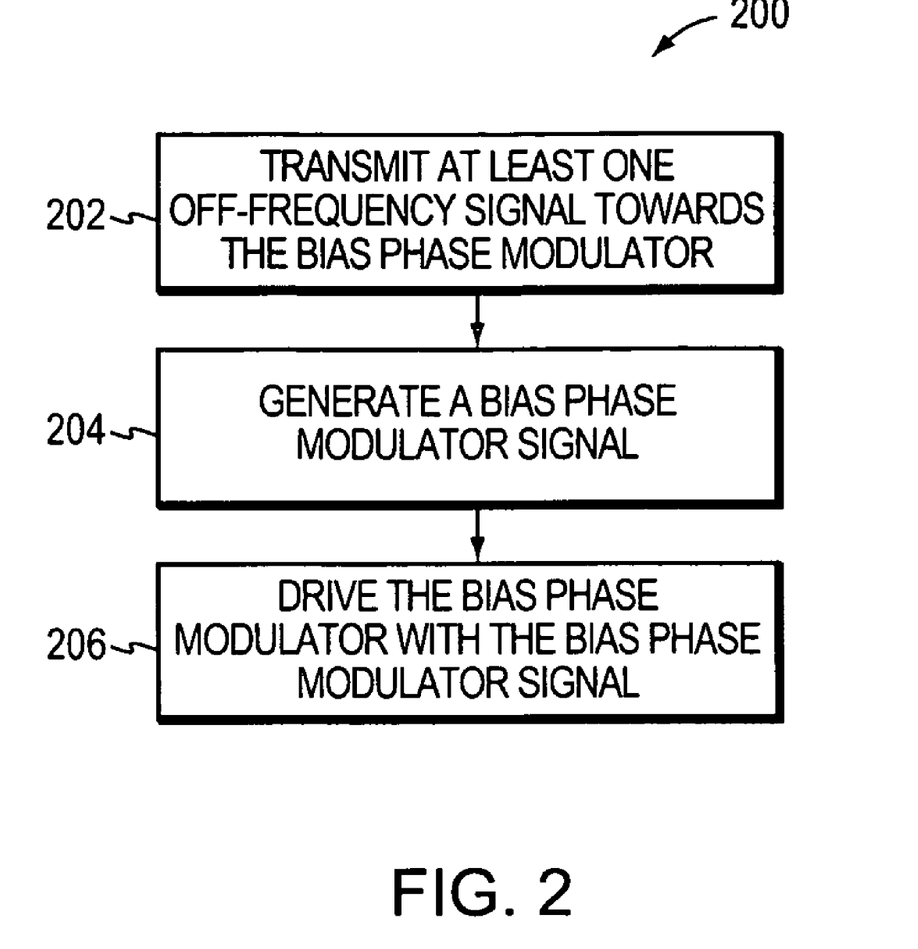
FIG. 2 is a flow diagram of an illustrative approach to transmitting an off-frequency signal and generating a bias phase modulator signal in an interferometric fiber-optic gyroscope in accordance with one embodiment of the invention.

Referring now to FIG. 2, one embodiment of a method 200 for converting the off-frequency signal(s) 144 to a bias phase modulator signal 140, for example using the components of the gyroscope 100 depicted in FIG. 1, is shown. In brief overview, the off-frequency signal(s) 144 is/are transmitted towards the bias phase modulator 114 (step 202), the bias phase modulator signal 140 is generated therefrom (step 204), and the bias phase modulator 114 is driven with the bias phase modulator signal 140 (step 206).

In greater detail, and with reference also to FIG. 1, at step 202 at least one off-frequency signal 144 is transmitted towards the bias phase modulator 114. In one embodiment, the off-frequency signal(s) 144 is/are generated by the bias modulation signal generator 124, which may be located at any position inside or outside the gyroscope 100. In another embodiment, the off-frequency signal(s) 144 are supplied by an external source. The off-frequency signal(s) 144 have a frequency different from the eigenfrequency of the gyroscope 100, and thus have negligible signal power at or near the eigenfrequency. The frequency of each off-frequency signal 144 may be, for example, one that is easily convertible into the eigenfrequency, such as an integer multiple or integer fraction of the eigenfrequency. In one embodiment, the frequency of each off-frequency signal 144 is substantially equal to half the eigenfrequency.

In addition, the off-frequency signal(s) 144 may have a different phase than the bias phase modulator signal 140, such that the rising or falling edges of each off-frequency signal 144 and the bias phase modulator signal 140 do not occur simultaneously. In one embodiment, two off-frequency signals are generated and transmitted by the off-frequency bias modulation signal generator 124. As described further below, the two off-frequency signals may be offset by 90 degrees from one another, or may be substantially equal in magnitude but opposite in sign from one another.

Once generated, the off-frequency signal(s) 144 are transmitted to the signal converter 126, which may have an input for each off-frequency signal. In one embodiment, the signal converter 126 has two inputs corresponding to two off-frequency input signals 144.

In one embodiment, the off-frequency signal(s) 144 do not require isolation from the rotation rate detector signal 142, because interference, if any, from the off-frequency signal(s) 144 is off-band to the rotation rate detector signal 142. The two signals 142, 144 may thus be routed in two wires in the same cable, near each other on a printed circuit wiring board, or through the same connector(s). By removing the constraint that the gyroscope 100 must maintain a very high level of isolation between the rotation rate detector signal 142 and the off-frequency signal(s) 144, the overall design of the gyroscope 100 may be simplified.

At step 204, the bias phase modulator signal 140, which has a frequency substantially equal to the eigenfrequency of the gyroscope 100 (i.e., which has measurable signal power at or near the eigenfrequency of the gyroscope 100), is generated from the off-frequency signal(s) 144. An electronic circuit, such as the signal converter 126 shown in FIG. 1 and described further below with reference to FIGS. 3-5, may generate the bias phase modulator signal 140. The signal converter 126 may be designed to add little or no delay to the converted signal. In other words, the delay between an input to the signal converter 126 and an output from the signal converter 126 may be very small or near zero. This design may make the timing of the output signal more predictable because a longer delay is subject to more variance if the signal converter 126 is subjected to, for example, variations in processing conditions, temperature, or voltage.

At step 206, the bias phase modulator 114 is driven with the bias phase modulator signal 140 generated by the signal converter 126 and output therefrom. In one embodiment, the signal converter 126 is located physically close to its point of use—the bias phase modulator 114—to minimize the signal path of the bias phase modulator signal 140, and thereby minimize the amount of interference to which the bias phase modulator signal 140 may subject the rotation rate detector signal 142. In an alternative embodiment, the signal converter 126 is integrated with the bias phase modulator 114.

Figure 3A:
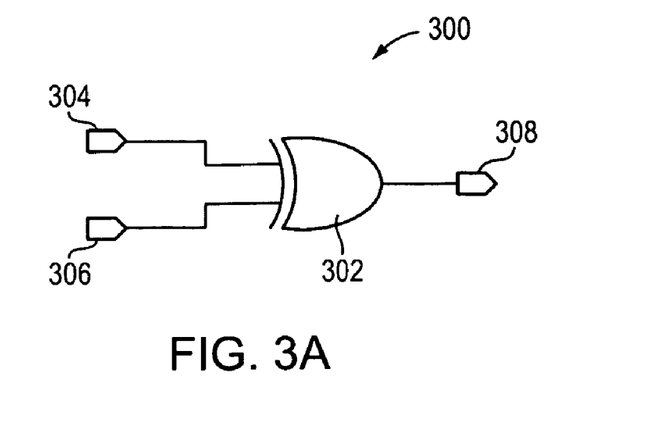
FIG. 3A illustrates an embodiment of a signal converter using an XOR gate.
Figure 3B:
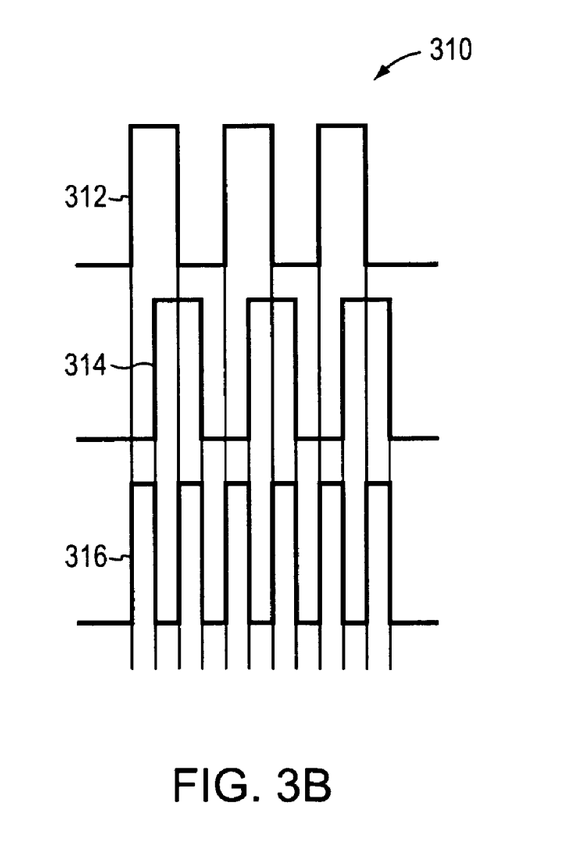
FIG. 3B illustrates two exemplary input waveforms and a resulting output waveform for the signal converter depicted in FIG. 3A.

FIG. 3A illustrates one embodiment 300 of the signal converter 126. As illustrated, the embodiment 300 includes an XOR gate 302 that generates an output 308 that is equal to a positive nonzero DC voltage ("high") when one of the inputs 304, 306 is high and the other is zero volts ("low"), and low when both of the inputs 304, 306 are high or when both of the inputs 304, 306 are low. This embodiment 300 of the signal converter 126 may be supplied with the two input voltage waveforms 312, 314 shown in the waveform diagram 310 of FIG. 3B by, for example, the off-frequency bias modulation signal generator 124. For example, the first waveform 312 may be applied to the first input 304, and the second waveform 314 may be applied to the second input 306. As shown in FIG. 3B, the two input waveforms 312, 314 may have the same frequency and amplitude but may be offset by 90 degrees from one another. The XOR gate 302 may produce the output waveform 316, which may oscillate at twice the frequency of the input signals 312, 314. The frequency of the output signal 316 may be the eigenfrequency of an interferometric fiber-optic gyroscope, such as, for example, the gyroscope 100. The amplitude of the output signal 316 may be the same as or different from the amplitude of the input signals 312, 314.

Figure 4:
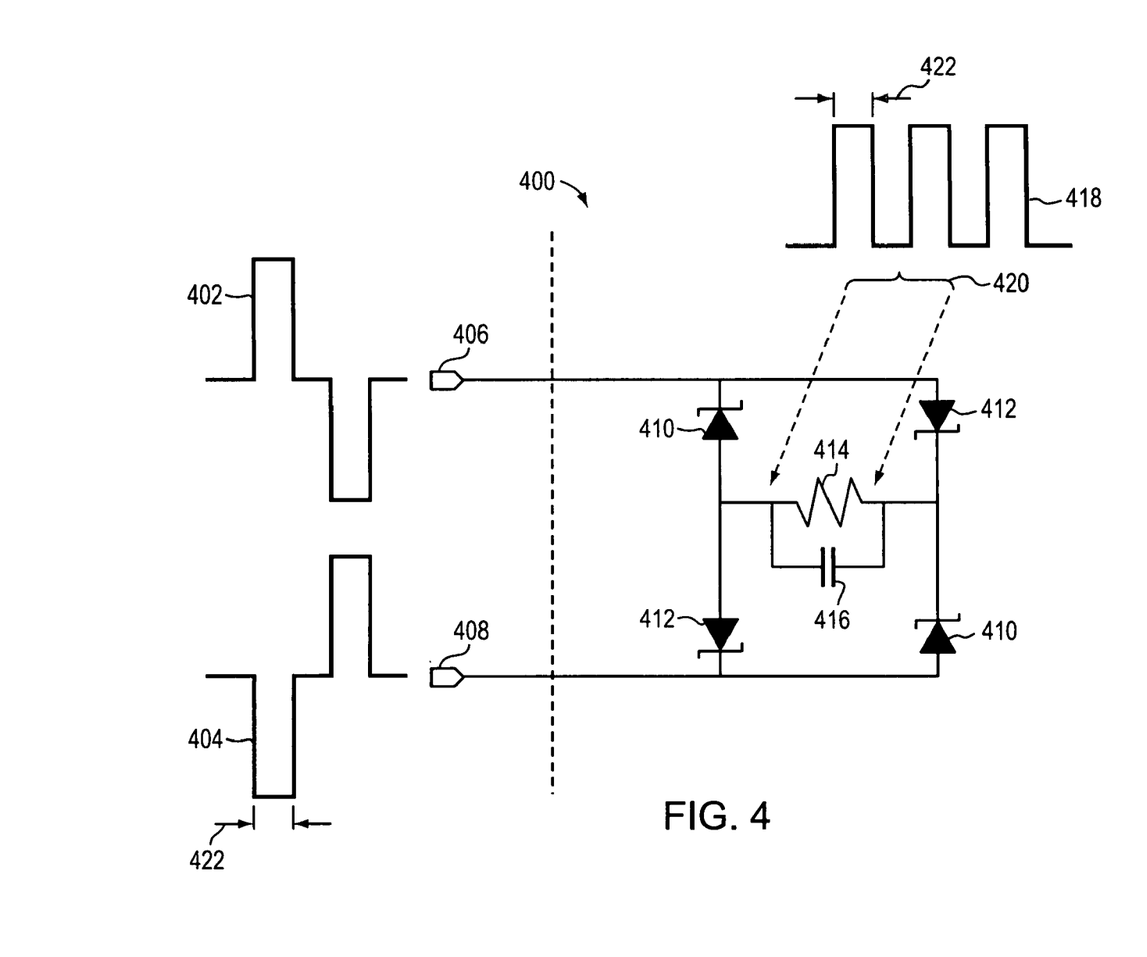
FIG. 4 illustrates an embodiment of a signal converter using a rectifier.

FIG. 4 illustrates another embodiment 400 of the signal converter 126. Input waveforms 402 and 404, which may be substantially equal in magnitude but opposite in sign, may be applied to the input terminals 406, 408 of the full-wave bridge rectifier circuit 400. First and second pairs of diodes 410, 412 work together to apply a varying positive voltage across the resistor 414 and the capacitor 416. The resultant output waveform 418 across the output terminals 420 may have a frequency that is different from the frequencies of the input signals 402, 404, but may have the same pulse width 422. The frequency of the output signal 418 may be the eigenfrequency of an interferometric fiber-optic gyroscope, such as the gyroscope 100 depicted in FIG. 1.

Figure 5:
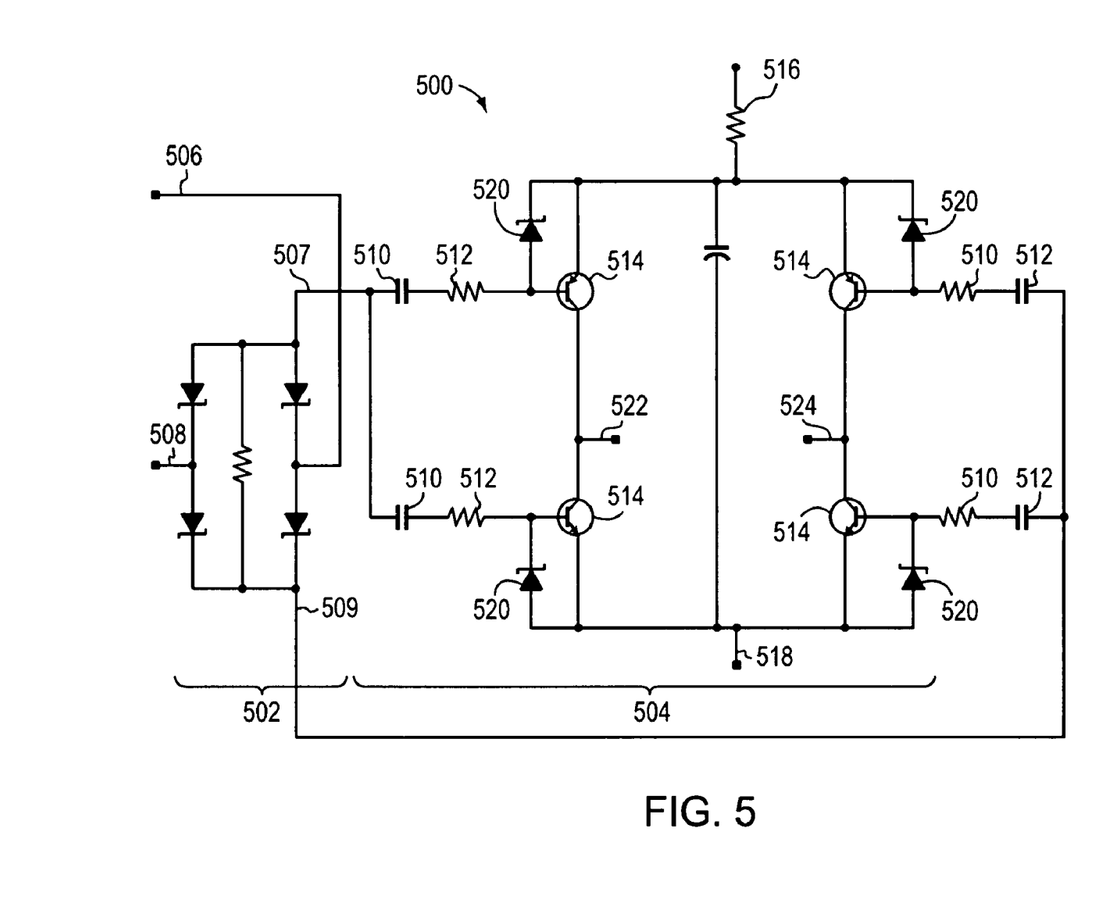
FIG. 5 illustrates an embodiment of a signal converter using a rectifier and an H-bridge circuit.

FIG. 5 illustrates a third embodiment 500 of the signal converter 126. The circuit 500 features a full-wave bridge rectifier 502, similar to the rectifier 400 shown in FIG. 4, and an H-bridge circuit 504. Input waveforms, such as the waveforms 402, 404 illustrated in FIG. 4, may be applied to the input terminals 506, 508. The output terminals 507, 509 of the full-wave bridge rectifier 502 may produce an output waveform, which may be similar to the output waveform 418, and transmit it to the H-bridge circuit 504 through filter capacitors 510 and resistors 512. The diodes 520 may protect the base-emitter junctions of the transistors 514 from being reverse-biased by large voltages produced by the rectifier 502. The transistors 514, biased by a power supply terminal 516 and a ground terminal 518, may remove the DC bias of the bridge rectifier 502 output waveform 418 by alternating the polarity of the voltage across the output terminals 522, 524 in response to the output 507, 509 of the rectifier 502. The output terminals 522, 524 may therefore provide a square-wave voltage waveform that has an average DC value of zero volts. In addition, the H-bridge circuit 504 output voltage may improve the shape of the square-wave output waveform so that it has sharper vertical regions and flatter horizontal regions.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method for driving a bias phase modulator in an interferometric fiber-optic gyroscope, the method comprising:
    transmitting, towards the bias phase modulator, at least one off-frequency signal having a frequency different from an eigenfrequency of the gyroscope;
    generating, from the at least one off-frequency signal, a bias phase modulator signal having a frequency substantially equal to the eigenfrequency of the gyroscope; and
    driving the bias phase modulator with the bias phase modulator signal.

2. The method of claim 1 further comprising generating the at least one off-frequency signal.

3. The method of claim 1, wherein two off-frequency signals are transmitted.

4. The method of claim 3, wherein the two off-frequency signals are offset by 90 degrees from one another.

5. The method of claim 3, wherein the two off-frequency signals are substantially equal in magnitude, but opposite in sign, to one another.

6. The method of claim 1, wherein each off-frequency signal has a frequency substantially equal to one-half the eigenfrequency of the gyroscope.

7. The method of claim 1, wherein each off-frequency signal has negligible signal power at or near the eigenfrequency of the gyroscope.

8. A system for driving a bias phase modulator in an interferometric fiber-optic gyroscope, the system comprising:
    an off-frequency signal generator for transmitting at least one off-frequency signal having a frequency different from an eigenfrequency of the gyroscope; and
    a signal converter for i) generating, from the at least one off-frequency signal, a bias phase modulator signal having a frequency substantially equal to the eigenfrequency of the gyroscope, and ii) providing the bias phase modulator signal to the bias phase modulator.

9. The system of claim 8, wherein the off-frequency signal generator is further configured to generate the at least one off-frequency signal.

10. The system of claim 8, wherein each off-frequency signal has negligible signal power at or near the eigenfrequency of the gyroscope.

11. The system of claim 8 further comprising a signal processing circuit for removing out-of-band interference from a rotation rate detector signal output from the gyroscope.

12. The system of claim 8 further comprising the bias phase modulator.

13. A method for driving a bias phase modulator in an interferometric fiber-optic gyroscope, the method comprising:
    transmitting, towards the bias phase modulator, at least one first signal having negligible signal power at or near an eigenfrequency of the gyroscope;
    generating, from the at least one first signal, a bias phase modulator signal having measurable signal power at or near the eigenfrequency of the gyroscope; and
    driving the bias phase modulator with the bias phase modulator signal.

14. A system for driving a bias phase modulator in an interferometric fiber-optic gyroscope, the system comprising:
    means for transmitting, towards the bias phase modulator, at least one first signal having negligible signal power at or near an eigenfrequency of the gyroscope;
    means for generating, from the at least one first signal, a bias phase modulator signal having measurable signal power at or near the eigenfrequency of the gyroscope; and
    means for driving the bias phase modulator with the bias phase modulator signal.

* * * * *